United States Patent [19]

Fenton et al.

[11] 4,083,945
[45] Apr. 11, 1978

[54] PROCESS FOR THE TREATMENT OF HYDROGEN SULFIDE GAS STREAMS

[75] Inventors: Donald M. Fenton, Anaheim; Byron B. Woertz, Claremont, both of Calif.

[73] Assignee: Union Oil Company of California, Brea, Calif.

[21] Appl. No.: 758,041

[22] Filed: Jan. 10, 1977

[51] Int. Cl.$^2$ .............................................. C01B 17/04
[52] U.S. Cl. .................................. 423/573 R; 423/226
[58] Field of Search ................ 423/226, 571, 573, 551

[56] References Cited

U.S. PATENT DOCUMENTS

| | | | |
|---|---|---|---|
| 1,792,097 | 2/1931 | Jacobson | 423/226 X |
| 3,794,711 | 2/1974 | Bhatia et al. | 423/551 X |
| 3,928,535 | 12/1975 | Schulz | 423/551 X |
| 3,972,989 | 8/1976 | Fenton et al. | 423/226 X |

*Primary Examiner*—G. O. Peters
*Attorney, Agent, or Firm*—Richard C. Hartman; Dean Sandford; Gerald L. Floyd

[57] ABSTRACT

In gas/liquid contact processes for the absorption of sulfur gas streams using alkaline, oxygen regenerated washing solutions, for example as in the Stretford process, the washing solution is treated with a soluble aldehyde to control the rate of formation of thiosulfate salts in the solution. The thiosulfate is thus oxidized to sulfate which is subsequently recovered without any substantial loss of washing solution.

14 Claims, 1 Drawing Figure

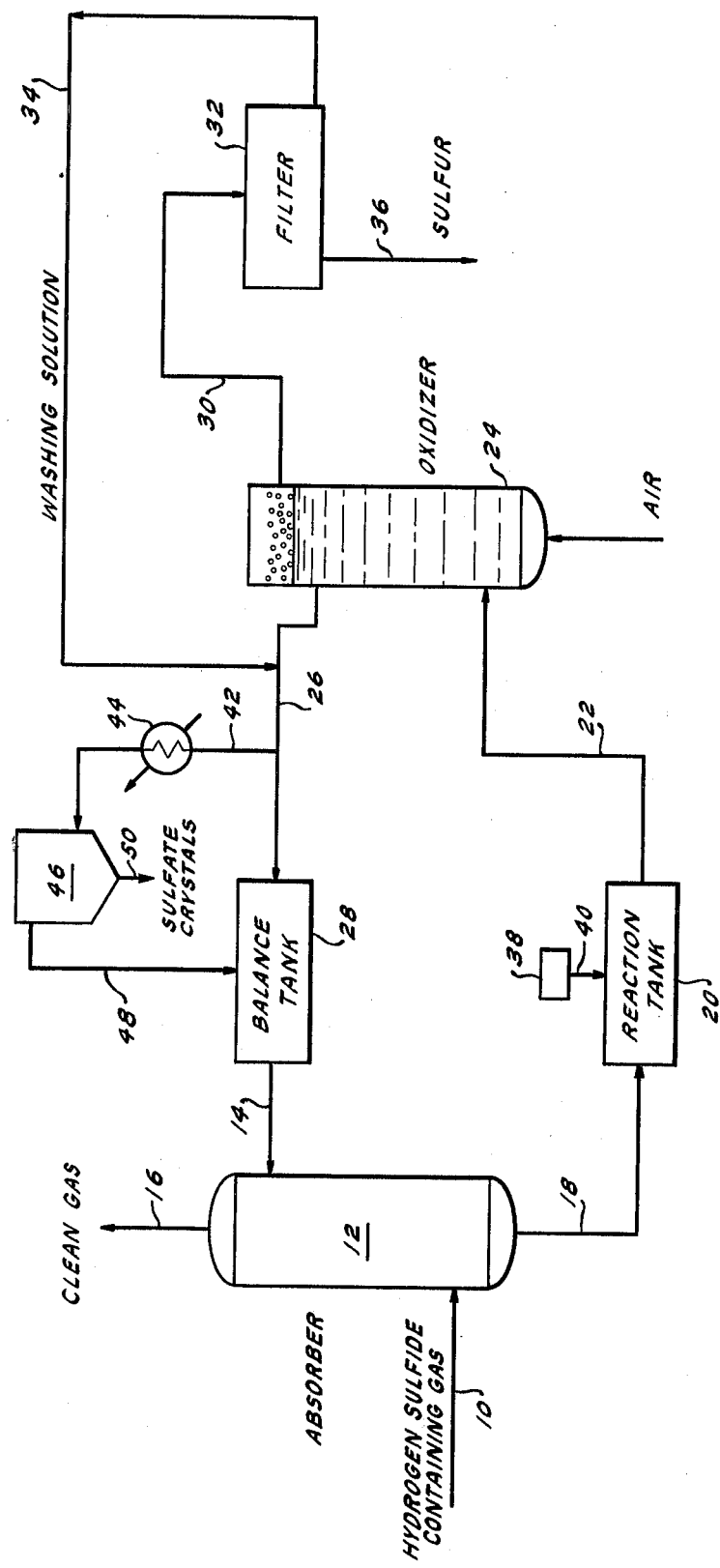

PROCESS FOR THE TREATMENT OF HYDROGEN SULFIDE GAS STREAMS

BACKGROUND OF THE INVENTION

This invention relates to the removal of hydrogen sulfide from gases, and more particularly to a process for removing hydrogen sulfide from hydrogenated Claus process tail gas.

With the increasing concern over the pollution of the atmosphere, great demands have been made on industry to produce pollution-free products and to do so in a pollution-free manner. One area of particular concern has been the release of sulfur and its compounds into the atmosphere during the refining of petroleum, the sweetening of sour natural gas, the processing of ore, the destructive distillation of coal, and during other processes which produce sulfur-containing gases.

A process widely employed for the desulfurization of hydrogen sulfide containing gases is the Claus process. The Claus process is about 90 to 97% effective in converting hydrogen sulfide to elemental sulfur and while substantial amounts of sulfur are recovered, thus preventing its release into the atmosphere, in many instances it is necessary to further treat the Claus process tail gas to make it acceptable for discharge into the atmosphere. Several processes are available for treating such tail gases including, for example, the Beavon sulfur removal process described in U.S. Pat. No. 3,752,877. This process involves the hydrogenation of the Claus process tail gas to convert the various sulfur compounds to hydrogen sulfide, and then employing a gas/liquid contact process to remove the remaining hydrogen sulfide. Representative of such gas/liquid contact processes is the Stretford process, a well-known process for converting hydrogen sulfide to elemental sulfur which is described in U.S. Pat. Nos. 2,996,439, 3,035,889, and 3,097,926. The Stretford process involves the contacting of the hydrogen-sulfide containing gas stream with an alkaline washing solution containing an alkali to maintain the pH, anthraquinone disulfonate (ADA), and a water-soluble metal vanadate. The hydrogen sulfide is oxidized to elemental sulfur which is subsequently separated and recovered from the washing solution. The washing solution is subsequently regenerated with oxygen and recycled to the gas contacting step. Other processes are also available which involve contacting the gas with an aqueous alkaline washing solution containing a regenerable oxidizing agent.

A major problem with these types of processes resides in the formation of salts in the washing solution, particularly thiosulfate salts. The formation of these salts results in a consumption of the alkali and, unless removed, these salts can build to a level where serious corrosion and process fouling problems will occur. Conventionally, a portion of the washing solution is bled off periodically for disposal while fresh makeup solution is introduced into the process. The removed solution represents a disposal problem and, in addition, represents a substantial waste of active components, particularly of the ADA and vanadium which are expensive.

SUMMARY OF THE INVENTION

The present invention overcomes the foregoing deficiencies by providing a process for the treatment of hydrogen sulfide containing gas streams by contacting the gas stream with an aqueous alkaline washing solution comprising a water-soluble, regenerable oxidizing agent wherein the process includes a treatment step for the washing solution to control the rate of thiosulfate salt formation and to maintain the thiosulfate salt level at a desired concentration without adversely affecting the active components of the washing solution. In accordance with the present invention a soluble aldehyde is added to the washing solution to oxidize to a sulfate at least a portion of the thiosulfate salts contained therein. The sulfate salts are subsequently removed from the solution, such as by cooling and precipitation.

In the foregoing process the thiosulfate salts are readily maintained at a desired concentration without the necessity of removing and disposing of any portion of the washing solution. Thus, conservation of the active components of the washing solution is achieved and the problems associated with the disposal of a salt-containing washing solution bleed-stream are avoided. Other advantages and features of the present invention will be apparent from the following detailed description taken in conjunction with the drawing.

BRIEF DESCRIPTION OF THE DRAWING

The sole FIGURE is a flow diagram of the process for the treatment of hydrogen sulfide-containing gas streams according to the present invention.

DESCRIPTION OF THE PREFERRED EMBODIMENT

Referring to the drawing there is illustrated an embodiment of the invention utilizing a gas/liquid contact process for treating a hydrogen sulfide-containing gas stream with an aqueous alkaline washing solution to produce an effluent gas of reduced sulfur content and to yield elemental sulfur. While for the purposes of description and illustration, the invention will be described in connection with the Stretford process, the invention is applicable to any alkaline aqueous solution used to treat a sulfur-containing gas stream in which an oxygen containing gas is introduced at some point in the process.

The gas stream is introduced by a line 10 into the lower portion of an absorber 12 for counter-current contact with the washing solution which is led into the upper portion of the absorber by a line 14. The gas stream of reduced sulfur content is led out of the absorber 12 by a line 16 while the washing solution, now enriched in sulfur content, exits the absorber through a line 18 and is led thereby to a reaction tank 20. The washing solution passes through a line 22 to a regenerator 24 for regeneration by contact with oxygen and for separation of the sulfur. The washing solution is then recirculated to the gas contacting step through a line 26 to a balance tank 28 where it is held for reintroduction into the absorber 12 through the line 14.

The washing solution is an aqueous solution which has been made alkaline to a pH of above 7, preferably between about 8.5 and 9.5, by the addition of alkalis such as caustic soda, caustic potash, ammonia; or sodium, potassium, or ammonium carbonates or bicarbonates; or organic bases such as alkanolamines. The preferred alkalis are sodium carbonate and bicarbonate, with sodium carbonate being the most preferred. A mixture of sodium carbonate and bicarbonate may also be used, such as a mixture of about 1–8 gm/l of sodium carbonate with about 10–30 gm/l of sodium bicarbonate.

In the Stretford process the solution also contains anthraquinone disulfonate (ADA), particularly the disodium salt. Any of the known isomers of ADA are suitable for use in this process and mixtures of these isomers may be used with advantage, including commercially available mixtures which include 1,5/1,8; 1,6/1,7; or 2,6/2,7 ADA and possibly small quantities of other isomers. The 2,7 isomer is the most preferred since it is more soluble in water. The concentration of ADA in this solution, calculated as the disodium salt, can be as high as 6 gm/l but more preferably ranges from about 0.3 to 3 gm/l, and most preferably about 2.5 gm/l. Throughout this description, the concentration of ADA will be given in terms of the disodium salt.

The washing solution also contains vanadium in a watersoluble form, such as the alkali metal or ammonium vanadates, including sodium metavanadate, sodium orthovanadate, sodium pyrovanadate, sodium ammonium vanadate or isopolyvanadate, or ammonium vanadate, with sodium metavanadate being preferred. The concentration of vanadium in the solution, calculated as the metal, should be no more than about 10 gm/l, with the preferred range being 0.3 to 6 gm/l. The optimum concentration of vanadate depends upon the volumetric flow rate of the gas and of the solution, and upon the concentration of the hydrogen sulfide in the gas being treated.

Although it is not completely understood, it is believed that the alkaline washing solution absorbs the hydrogen sulfide in the gas stream by forming sodium hydrosulfide in accordance with the following formula:

$$H_2S + Na_2CO_3 \rightarrow NaHS + NaHCO_3 \qquad (1)$$

The hydrosulfide is then oxidized to elemental sulfur by a reaction most conveniently represented as follows:

$$NaHS + NaHCO_3 + 2NaVO_3 \rightarrow S + Na_2V_2O_5 + Na_2CO_3 + H_2O \qquad (2)$$

Reaction (1) and (2) begin in the absorber 12 and the solution is held in the reaction tank 20 for sufficient time to permit reaction (2) to be completed. Residence time in the reaction tank 20 typically ranges between about 10 and about 15 minutes.

The regeneration of the washing solution is carried out in the regenerator 24 by contacting the solution with oxygen or an oxygen-containing gas, such as air. In the presence of the ADA, the regeneration is represented by the formula:

$$Na_2V_2O_5 + \tfrac{1}{2}O_2 \xrightarrow{ADA} 2NaVO_3 \qquad (3)$$

In the embodiment shown, the elemental sulfur formed in accordance with reaction (2) appears in the upper part of the regenerator 24 as a froth. The froth is led by means of a line 30 to a suitable separator means such as a filter 32 for separation of the sulfur and after filtering the washing solution is returned to the process through a return line 34. The sulfur is recovered at 36. Although not essential, it is often desirable to include an autoclave (not shown) after the filter 32, and in many cases it is preferred to replace the filter step altogether with an autoclave. The autoclave functions to heat the sulfur-containing froth to a sufficiently high temperature to melt the sulfur which is then subsequently separated from the solution and recovered.

As discussed, a major problem in the foregoing process resides in the production of thiosulfate salt. Although a certain amount of thiosulfate salt can be tolerated in the washing solution and can even be beneficial in the process, for example by reducing the rate of ADA consumption, when the thiosulfate salt concentration builds up to an excessive level, the salt causes processing and corrosion problems. In addition, thiosulfate salt formation consumes the alkali and increases the chemical cost of the process.

Typically the thiosulfate level is maintained by periodic bleed-off of washing solution and replacement with fresh solution to dilute the salt content of the process washing solution. In a commercial process an excessive level of thiosulfate salt concentration has been found to be on the order of 180 gm/l. However, the acceptable level of thiosulfate salt in the washing solution and the concentration of thiosulfate which is considered excessive can vary depending upon the nature of the processing equipment, the type and sulfur content of the gas stream being treated and other factors readily ascertained by those skilled in the art.

Thiosulfate salt buildup is a problem with any process utilizing an oxygen regenerable alkaline washing solution to treat the sulfur-containing gas stream. For example, processes using alkaline aqueous ferric hydroxide solutions (Ferrox Process) or alkaline aqueous arsenate solutions (Giammarco Vetrocoke Process) or alkaline solutions of sodium 1,4-naphthaquinone-2-sulfonate (Takahax Process) can also be troubled by thiosulfate buildup and the problems associated therewith.

The precise point in the process and the exact reactions involved in the formation of the thiosulfate salts are not completely understood in view of the relatively complex chemistry of the processes for treating hydrogen sulfide-containing gas streams. However, it is believed that the following reactions are those which most likely occur in processes utilizing an alkaline aqueous solution to absorb the sulfur content of gas streams.

An important cause of thiosulfate salt buildup is believed to be the result of the reaction between oxygen and the hydrosulfide (SH) formed in the absorber, as represented by the following formula:

$$2NaSH + 2O_2 \rightarrow Na_2S_2O_3 + H_2O \qquad (4)$$

In addition, where high temperatures exist, such as in an autoclave used to separate the elemental sulfur from the washing solution, the following reactions are believed to occur:

$$3S + 2H_2O \rightarrow 2H_2S + SO_2 \qquad (5)$$

$$S + SO_2 + Na_2CO_3 \rightarrow Na_2S_2O_3 + CO_2 \qquad (6)$$

From reactions (4) and (6) it will be seen that the formation of thiosulfate also results in the loss of alkali. This occurs either through direct chemical consumption as in (6) or by tying up the sodium ion as in (4). Accordingly for each mole of thiosulfate salt formed, a mole of alkali is used and must be replaced in the solution to maintain the proper alkali balance.

In accordance with the present invention the addition of a soluble aldehyde to the washing solution results in the oxidation of the thiosulfate salt to sulfate. The sulfate is then removed by suitable means such as crystallization and precipitation.

Referring to the drawing, a soluble aldehyde is introduced to the washing solution at the reaction tank 20 from a suitable vessel 38 which is in communication with the reaction tank by a line 40. A line 42 communicates with the line 26 intermediate the regenerator 24 and the balance tank 28 for leading a portion of the washing solution through a cooler 44 to a crystallizer/precipitator 46 for separation of sulfate crystals from the washing solution. The washing solution is returned to the system from the crystallizer 46 by a line 48 and the sulfate crystals are recovered in a suitable receiving vessel (not shown) through a line 50.

The point at which the soluble aldehyde is introduced into the system is not critical and the aldehyde can be added at any convenient point in the system. Likewise, the point in the system at which the washing solution is removed for cooling and the sulfate crystals separated is not critical, although it is preferred that the crystallization-separation step occur at a point intermediate the absorber 12 and the regenerator 24 so that the washing solution is relatively free of elemental sulfur which may coprecipitate with the sulfate. In this manner, loss of sulfur as a result of coprecipitation or the necessity for additional treatment of the sulfate crystals to separate and recover the coprecipitated sulfur is avoided.

The soluble aldehydes used in the invention include aliphatic and aromatic compounds in which generally the aldehyde radical contains 7 or less carbon atoms. As used herein, a soluble aldehyde is one which has a solubility greater than 0.3 parts/100 parts. Included among the aliphatic aldehydes are compounds such as formaldehyde, acetaldehyde, propionaldehyde, butyraldehyde, glyoxal, acrolein, and crotonaldehyde. The aliphatic aldehydes can be saturated or unsaturated and may also include halogen substituted compounds such as chloral (trichloroacetaldehyde). Aryl aldehydes are also useful in the present invention although generally they are not as soluble in the alkaline solutions as the aforementioned aliphatic aldehydes. Useful among the aryl aldehydes, however, are phthalic aldehyde, phthalic acetaldehyde, and soluble substitution products thereof.

In view of their ready solubility in water, it is highly preferred to use aliphatic aldehydes in the present invention with formaldehyde and acetaldehyde being most preferred and formaldehyde being most highly preferred. Formaldehyde is readily available in stable solution form, for example water solutions of 37 wt.% to 50 wt.% of formaldehyde stabilized with small amounts of methanol. In addition, however, paraformaldehyde is also soluble in water and thus readily used in the present invention. Formaldehyde is also useful in its cyclic polymerized forms, such as trioxane, (trioxymethylene) or tetraoxymethylene.

The precise mechanism by which the aldehyde causes the oxidation of the thiosulfate salts is not known but it is believed that the aldehyde reacts with oxygen in the basic solution to form a peroxyacid. Peroxyacids are strong oxidizing agents and it is believed that the thiosulfate is oxidized to the sulfate by the peroxyacids. From the standpoint of material balance, the oxidation of the thiosulfate in the washing solution can be best summarized by the following general formula, where for purposes of illustration the aldehyde utilized is formaldehyde:

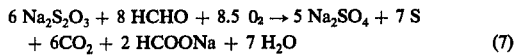

$$6\ Na_2S_2O_3 + 8\ HCHO + 8.5\ O_2 \rightarrow 5\ Na_2SO_4 + 7\ S + 6CO_2 + 2\ HCOONa + 7\ H_2O \quad (7)$$

The amount of aldehyde which is introduced into the washing solution is not critical and depends on factors such as the particular aldehyde being used, the initial thiosulfate salt level of the washing solution, the size of the system, the rate of thiosulfate formation, and the level at which it is desired to maintain the thiosulfate salt in the solution. As mentioned above, some thiosulfate in the washing solution can be beneficial in preventing chemical consumption of ADA and normally it would not be considered good practice to reduce the thiosulfate to a zero level. In the system for treating Claus process tail gas described in the example, it has been found that the thiosulfate levels should be maintained at or below 180 gm/l and preferably on the order of 40 gm/l - 130 gm/l. Accordingly, the aldehyde can be added as needed when the thiosulfate level approaches a desired maximum concentration or the aldehyde can be introduced in smaller, more uniform increments, or even continuously, in order to maintain the thiosulfate at a desired level, for example at 130 gm/l. It should also be noted that excessive concentrations of aldehyde in the washing solution should be avoided since a characteristic aldehyde odor is readily detected for example in the air leaving the regenerator 24 and in the area around the filter 32. This is readily corrected by reducing the aldehyde addition until the odor has disappeared. In addition, excessive concentrations of an aldehyde may cause problems in separating the sulfur from the washing solution. Otherwise, however, the maximum concentration of aldehyde in the washing solution is not critical. However, it is highly preferred to maintain the aldehyde concentration in the washing solution below the aldehyde odor level for the particular aldehyde being used. Thus, for example, when utilizing formaldehyde it has been found that the characteristic formaldehyde odor is noticed when the concentration of the formaldehyde in the washing solution approaches about 1 gm/l. Accordingly, it is preferred to maintain the formaldehyde concentration in the washing solution at or less than the odor level of about 1 gm/l. The odor level for other aldehydes will vary depending upon the particular aldehyde being used and upon the type of alkaline washing solution being utilized. Likewise, it is preferred with formaldehyde to maintain at least 0.1 gm/l in the solution although the minimum concentration of aldehyde is largely dependent upon the desired rate of thiosulfate oxidation and is not critical.

The invention is further described by the following examples which are illustrative of various aspects of the invention, and are not intended as limiting the scope of the invention as defined by the appended claims.

EXAMPLE 1

A 10-day test was conducted in a Beavon Stretford unit which was treating hydrogenated Claus process tail gas to reduce the sulfur content thereof. The process was as substantially shown in the drawing. The incoming gas stream contained an average of about 1.5 mol % of hydrogen sulfide and the unit produced in excess of about 2 long tons of sulfur per day.

At the start of the test period the washing solution contained 2.18 gm/l of ADA and 2.64 gm/l of soluble vanadium. The ADA and vanadium concentrations were maintained at this level throughout the test by the addition of makeup chemicals as needed. The pH of the solution was 8.7 and initially the solution contained about 5 gm/l of sodium carbonate and about 19 gm/l of sodium bicarbonate. The thiosulfate concentration at the start of the test was 133 gm/l, as sodium thiosulfate. Based on past experience with the unit treating Claus process tail gas, it was expected, under normal operating conditions, that the thiosulfate would build up at the rate of about 1 gm/l per day.

The aldehyde used was a 37 wt.% aqueous solution of formaldehyde containing about 1 wt.% of methanol as a polymerization inhibitor. The formaldehyde solution was added to the balance tank using a chemical feeder pump which was supplied by a suitable charge tank. The unit was operated continuously during the 10-day period although formaldehyde additions were made only during the night hours. Initially about 98 gallons per day of the aqueous formaldehyde solution (0.4299 gm/l/day of formaldehyde) were added to the washing solution during the first 7 days of the test. During the last 4 days of the test, addition of the formaldehyde solution was doubled to about 195 gallons per day (.8598 gm/l/day of formaldehyde). Samples of the washing solution were taken each day of the test period and analyzed. The daily analysis are set forth in Table A below and unless otherwise indicated are reported as grams per liter corrected to a constant solution volume of 100,000 gallons.

water and analyzed for sodium thiosulfate. The various test solutions tested and the thiosulfate concentration of each are summarized in Table B.

TABLE B

| Solution | Aldehyde, gm/l* | $Na_2S_2O_3$, gm/l |
|---|---|---|
| G | Blank | 79 |
| H | Formaldehyde, 10 | 73 |
| I | Glyoxal, 10 | 76 |
| J | Crotonaldehyde, 10 | 70 |
| K | Benzaldehyde, 10 | 79 |

*With the exception of benzaldehyde, the aldehydes were used as aqueous solutions of the following strength:
formaldehyde 37%
glyoxal 40%
crotonaldehyde 91%

The foregoing screening tests indicate that the aldehyde in solutions H, I, and J are suitable for use in the process while in solution K, benzaldehyde is insufficiently soluble to cause the oxidation of any significant amount of the thiosulfate salt.

While particular embodiments of the invention have been described, it will be understood, of course, that the invention is not limited thereto since many modifica-

TABLE A

SOLUTION ANALYSIS — GRAMS PER LITER

| | Test Days | | | | | | | | | |
|---|---|---|---|---|---|---|---|---|---|---|
| | 1 | 2 | 3 | 4 | 5 | 6 | 7 | 8 | 9 | 10 |
| Equiv. $Na_2CO_3$ | 15.48 | 14.98 | 13.67 | 13.15 | 11.59 | 10.63 | 9.68 | 9.22 | 8.00 | 6.82 |
| Thiosulfate ($Na_2S_2O_3 \cdot 5H_2O$) | 133.3 | 132.6 | 132.6 | 132.8 | 133.8 | 137.9 | 126.3 | 129.7 | 130.7 | 123.1 |
| Total Soluble Sulfur | 43.38 | 44.01 | 43.41 | 43.49 | 44.80 | 43.35 | 42.69 | 42.77 | 42.25 | 42.01 |
| $Na_2SO_4$ (Direct Analysis) | | 38.20 | | | | 39.32 | | | | |
| $Na_2SO_4$ (Calculated)* | 38.17 | 41.71 | 39.08 | 39.16 | 43.85 | 32.75 | 43.10 | 39.49 | 36.07 | 43.67 |
| Sodium | 41.88 | 42.63 | 43.41 | 42.71 | 43.02 | 40.77 | 40.15 | 40.68 | 40.53 | 39.72 |
| Formaldehyde | 0 | 0.147 | 0.405 | 0.295 | 0.743 | 0.913 | 0.920 | 1.119 | 1.277 | 1.251 |
| Sodium Formate | 0 | | | | | | | | 1.003 | |

*Total soluble sulfur minus thiosulfate sulfur minus ADA sulfur.

From the data in the table it will be seen that the thiosulfate concentration decreased a total of about 10 gm/l during the test period. Average formaldehyde consumption during the test was on the order of about 0.4 gm/l per day. The unconsumed formaldehyde concentration in the washing solution built up to as high as about 1.3 gm/l and formaldehyde odor was noticeable at a formaldehyde concentration of about 1 gm/l.

EXAMPLE 2

The following screening tests were used to determine whether candidate aldehydes were sufficiently soluble to be effective as additives to a washing solution for the oxidation of a thiosulfate salt. The candidate aldehydes included formaldehyde, glyoxal, crotonaldehyde and benzaldehyde as being representative of aldehydes which are readily obtainable on a commercial basis.

An aqueous alkaline solution was prepared comprising 4.5 gm/l ADA, and 2.1 gm/l vanadium (as sodium vanadate). The solution was made alkaline to a pH of about 8.5 with 4.8 gm/l sodium carbonate and 36.2 gm/l sodium bicarbonate. In addition, 100 gm/l of sodium thiosulfate pentahydrate was added to the solution to provide the thiosulfate content.

To a 100 ml aliquot of the solution was added 10 grams of the candidate aldehyde and the volume noted. The solution, including the aldehyde, was oxidized at room temperature by bubbling air at the rate of 2 cu.ft/hr through the solution for 24 hours. The air was introduced into the solution through a frittered glass sparger.

At the end of the 24-hour test period, the solution was brought back to its original volume with demineralized tions can be made and it is intended to include within the invention such modifications as are within the scope of the claims.

We claim:

1. In the process for treating a hydrogen sulfide containing gas by contact with an alkaline aqueous washing solution containing a regenerable oxidizing agent to oxidize the hydrogen sulfide to sulfur and to yield an effluent gas of reduced sulfur content, the washing solution being thereafter contacted with an oxygen containing gas to regenerate the washing solution prior to its recirculation back to the gascontacting step, and thiosulfate salts are formed in said solution, the improvement comprising the steps of:

maintaining a soluble aldehyde in said washing solution in an amount effective to oxidize to a sulfate at least a portion of the thiosulfate salt content of said washing solution, said aldehyde being selected from the group consisting of the formaldehyde, acetaldehyde, propionaldehyde, butyraldehyde, glyoxal, acrolein, crotonaldehyde, trioxane, tetraoxymethylene, paraformaldehyde, 2-hydroxybutyraldehyde, methacrolein, phthalic aldehyde, phthalic acid aldehyde, water-soluble substituted products thereof and water-soluble mixtures thereof; and recovering said sulfate from said washing solution.

2. The process of claim 1 wherein said soluble aldehyde is selected from aldehydes having a solubility in water of more than 3.0 parts per 100 parts of water at the operating temperature of said washing solution.

3. The process of claim 1 wherein said soluble aldehyde is an aliphatic aldehyde.

4. The process of claim 1 wherein said aldehyde is acetaldehyde.

5. The process of claim 1 wherein said aldehyde is formaldehyde.

6. The process of claim 1 wherein said aldehyde concentration in said washing solution is maintained below the aldehyde odor level for said aldehyde in said washing solution.

7. The process of claim 1 wherein said washing solution comprises an aqueous alkaline solution of a soluble metal vanadate and anthraquinone disulfonate.

8. The process of claim 1 wherein said sulfate is recovered from said washing solution by cooling said washing solution to precipitate said sulfate and thereafter separating said precipitated sulfate and said washing solution.

9. In the process for treating a hydrogen sulfide containing gas by contact with an alkaline aqueous washing solution comprising a soluble metal vanadate and anthraquinone disulfonate to yield an effluent gas of reduced sulfur content, the washing solution is thereafter regenerated by contact with an oxygen containing gas, elemental sulfur is recovered from said solution and said regenerated solution is recycled to said gas contacting step and thiosulfate salts are formed in said solution, the improvement which comprises a method for controlling the formation of said thiosulfate salts in said washing solution comprising the steps of:

introducing a soluble aldehyde to said washing solution in an amount effective to maintain in said washing solution a thiosulfate oxidizing amount of said aldehyde, thereby to oxidize at least a portion of said thiosulfate salt to a sulfate salt, said aldehyde being selected from the group consisting of formaldehyde, acetaldehyde, propionaldehyde, butyraldehyde, glyoxal, acrolein, crotonaldehyde, trioxane, tetraoxymethylene, paraformaldehyde, 2-hydroxybutyraldehyde, methacrolein, phthalic aldehyde, phthalic acid aldehyde, water-soluble substituted products thereof and water-soluble mixtures thereof;

cooling at least a portion of said washing solution to a temperature below the solubility of said sulfate; and thereafter separating said precipitated sulfate from said washing solution and returning said washing solution to said process for the treatment of said hydrogen sulfide containing gas.

10. The process of claim 9 wherein said aldehyde is formaldehyde.

11. The process of claim 10 wherein said formaldehyde is added to said washing solution in an amount sufficient to maintain the formaldehyde concentration in said washing solution between about 0.1 gm/l and about 1.0 gm/l.

12. The process of claim 9 wherein said aldehyde comprises an aqueous solution of formaldehyde.

13. The process of claim 9 wherein said washing solution is cooled to a temperature of on the order of 35° F to precipitate said sulfate from said solution.

14. The process of claim 9 wherein said thiosulfate salt is sodium thiosulfate and said sulfate salt is sodium sulfate.

* * * * *